US007262601B2

(12) United States Patent
Dransfield et al.

(10) Patent No.: US 7,262,601 B2
(45) Date of Patent: Aug. 28, 2007

(54) AIRCRAFT EQUIPPED FOR AIRBORNE VECTOR MAGNETIC EXPLORATION SURVEYS

(75) Inventors: Mark Dransfield, Victoria (AU); Guimin Liu, Victoria (AU); Asbjorn Norlund Christensen, Queensland (AU)

(73) Assignee: BHP Billiton Innovation Pty Ltd, Melbourne (AU)

( * ) Notice: Subject to any disclaimer, the term of this patent is extended or adjusted under 35 U.S.C. 154(b) by 0 days.

(21) Appl. No.: 10/504,213

(22) PCT Filed: Feb. 10, 2003

(86) PCT No.: PCT/AU03/00136

§ 371 (c)(1),
(2), (4) Date: Jan. 21, 2005

(87) PCT Pub. No.: WO03/069373

PCT Pub. Date: Aug. 21, 2003

(65) Prior Publication Data

US 2005/0116717 A1 Jun. 2, 2005

(30) Foreign Application Priority Data

Feb. 12, 2002 (AU) .................................... PS0500
Oct. 4, 2002 (AU) .............................. 2002951919

(51) Int. Cl.
*G01V 3/16* (2006.01)
(52) U.S. Cl. .................................................. 324/331
(58) Field of Classification Search ................ 324/331, 324/330, 244–247, 225, 202
See application file for complete search history.

(56) References Cited

U.S. PATENT DOCUMENTS

| | | | | |
|---|---|---|---|---|
| 2,692,970 A | * | 10/1954 | Tolles | 361/170 |
| 2,706,801 A | * | 4/1955 | Tolles | 324/244 |
| 3,530,375 A | * | 9/1970 | Passier | 324/331 |
| 5,182,514 A | * | 1/1993 | Rice, Jr. | 324/244 |
| 5,654,635 A | * | 8/1997 | Assous et al. | 324/244 |
| 5,850,624 A | * | 12/1998 | Gard et al. | 702/92 |

FOREIGN PATENT DOCUMENTS

| | | |
|---|---|---|
| RU | 1633930 | 12/1995 |
| RU | 2075097 | 3/1997 |
| RU | 2085850 | 7/1997 |
| SU | 792194 | 12/1980 |

OTHER PUBLICATIONS

Leliak, Paul, "Identification and Evaluation of Magnetic-Field Sources of Magnetic Airborne Detector Equipped Aircraft", *IRE Transactions on Aerospace and Navigational Electronics*, 1961, pp. 95-105.

* cited by examiner

*Primary Examiner*—Jay M. Patidar
(74) *Attorney, Agent, or Firm*—DLA Piper US LLP

(57) ABSTRACT

An aircraft equipped for airborne vector magnetic exploration surveys comprising three magnetometers orthogonally mounted to measure the components of the earth's vector magnetic field; two rotation sensors mounted to measure the angular orientation of the aircraft; and a recording system to record the measurements of the magnetometers, and rotation sensors. The measured angular orientation is used to orientate the measured components of the earth's vector magnetic field to derive true vector aero-magnetic (VAM) data from airborne surveys. Also disclosed is a method for processing magnetic data by removing the permanent, induced, and eddy-current magnetic effects of the aircraft from the magnetic data.

15 Claims, 5 Drawing Sheets

AIRCRAFT EQUIPPED FOR AIRBORNE VECTOR MAGNETIC EXPLORATION SURVEYS

CROSS REFERENCE TO RELATED APPLICATIONS

This application claims the benefit of priority under 35 USC § 119(a)-(d) of International Application No. PCT/AU03/00136, with an international filing date of 10 Feb. 2003, which claims priority to Australian Application No. PS0500, filed 12 Feb. 2002 and Australian Patent Application No. 2002951919 filed 4 Oct. 2002, which are incorporated herein by reference in their entirety.

TECHNICAL FIELD

This invention concerns an aircraft equipped for airborne vector magnetic exploration surveys. It also concerns a method of processing vector magnetic data collected during a survey flight of the aircraft.

BACKGROUND ART

Standard airborne magnetic surveys are performed with sensors that measure the total magnetic intensity (TMI) which is the magnitude of the total magnetic field vector. The total field is assumed to comprise the earth's field added to a local field dependent on the geology. Survey areas are sufficiently small that the earth's field may be assumed constant and so all variations are due to the geology. In practice one subtracts the magnitude of the earth's field from the measured values to obtain the local field.

Of course, this practice is incorrect because it fails to allow for the fact that the magnetic field is a vector field. The simple subtraction of magnitudes is only correct when the two vectors (earth field and local field) are parallel. In general, remanence and anisotropy mean that parallelism is rarely achieved, however, for local fields that are small compared to the earth's field and close to parallel with it, the simple subtraction is a reasonable approximation.

In situations where the remanent magnetic field is comparable in size to the earth's field and in a variety of directions, the assumption is unreliable. The breakdown of this assumption will also affect fields derived from the TMI such as the reduced-to-pole (RTP) and first vertical derivative (1VD) fields.

SUMMARY OF THE INVENTION

The invention is an aircraft equipped for airborne vector magnetic exploration surveys, comprising:

three magnetometers orthogonally mounted to measure the components of the earth's vector magnetic field;

two rotation sensors mounted to measure the angular orientation of the aircraft; and, a recording system to record the measurements of the magnetometers and rotation sensors; where, the measured angular orientation is used to orientate the measured components of the earth's vector magnetic field, to derive true vector magnetic data from airborne surveys, that is vector aero-magnetic (VAM) data.

In such a VAM system, the processing may be done in real time in the aircraft during a survey flight, or after the flight has taken place, in the laboratory.

The three magnetometers may be flux-gate magnetometers, each measuring the component of the earth's vector magnetic field along its axis, so that the triad is able to measure all three orthogonal components.

The rotation sensors may conveniently be provided by an inertial navigation system, such as may form part of an airborne gravity gradiometer. The sensors may be gyroscopes which measure heading, bank and elevation.

The attitude of the aircraft may be recorded to a precision which should allow the magnetic vector components to be corrected to better than 10 nT. This compares favourably with uncorrected data, where for instance, in the earth's field of about 60 000 nT, an orientation change of 6 degrees can produce a magnetic vector component error of about 10% or 6 000 nT.

In a further aspect the invention is a method of processing data collected during an airborne survey described above, comprising the following steps:

collecting data describing the orientation (attitude) of the aircraft using one or more rotation sensors (gyroscopes mounted on a gravity gradiometer platform);

collecting vector magnetic field data using a triad of magnetometers orthogonally mounted (flux-gate) in the aircraft; and using the aircraft attitude data provided by the rotation sensors to orient the magnetometer data; and then deriving true vector aero-magnetics.

The method involves the rotation of the 3 magnetic field components from the aircraft reference frame to the earth's reference frame using a program called vectorMagTilt, and a heading correction using a program called VectorMagHeadingCorrection. The required parameters for the correction are computed using a program called vectorMagCalibrate on the calibration survey data. The residual noise in the data after the heading correction is still high, but the processed VAM data still provides a useful adjunct to the TMI data for mapping and interpretation in areas of strong remanence (for instance, over strongly magnetised geology such as banded iron formations).

The method for processing for processing VAM data, may further comprise any one or more of the steps of:

removing the permanent magnet effect of the aircraft from the magnetic data;

removing the induced magnetic effect of the aircraft from the magnetic data; and removing the eddy-current magnetic effect of the aircraft from the magnetic data.

The formulas for the permanent magnet effect, induced magnetic effect and eddy-current magnetic effect of the aircraft may be based on Leliak (1961).

The technique may first involve ignoring the eddy-current effects and solving for the factors for the permanent magnet and induced magnetic dipole fields. The permanent magnet and induced magnetic fields may then be computed and removed from the survey data.

The eddy-current factors may then be computed from a high-pass filtered version of the corrected data. Alternatively, the eddy-current factors may be derived line-by-line on the survey data by a regression process.

Furthermore, the data after corrections of permanent magnet, induced magnetic and eddy-current effects may go through a residual angle effect correction by regression. The final corrected data are then written to the survey database.

Use of this aspect of the invention provides a significant reduction of the noise in the VAM data. Data processing results show excellent performance of the new technique in noise reduction.

BRIEF DESCRIPTION OF THE DRAWINGS

An example of the invention will now be described with reference to the accompanying drawings, in which.

BEST MODES OF THE INVENTION

Figure 1:
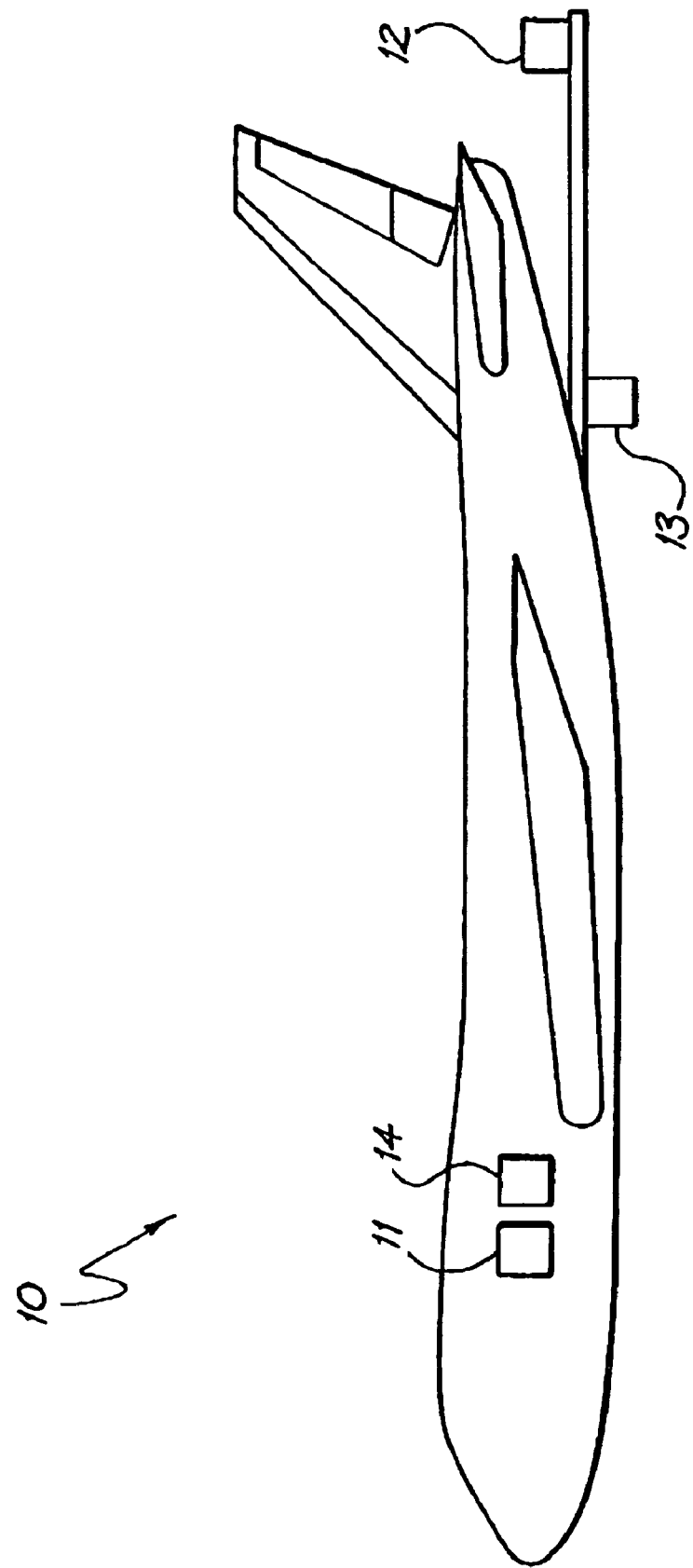
FIG. 1 is a schematic diagram of an aircraft equipped for an airborne survey.

The aircraft 10 carries on board an airborne gravity gradiometer (AGG) platform 11, a TMI sensor 12 to measure the total magnetic intensity, a triad of orthogonally mounted flux-gate magnetometers 13 to provide vector magnetic field data, and gyroscopes 14 mounted on the AGG platform 11 to continuously monitor and record the orientation (attitude) of the aircraft. The attitude information is used to control the platform and for laser scanner processing and self-gradient corrections of the AGG data.

The vector magnetic data has three components corresponding to the field magnitude in each of three orthogonal directions. This allows a wide variety of combinations to be formed and mapped. Examples include the components in each of the directions North, East and Down; the magnitude of the horizontal component; the inclination and declination angles; the TMI and the vector residual magnetic intensity (VRMI). The TMI should be the same as that measured by the TMI sensor and the difference can be taken as a measure of the vector noise. The VRMI is the magnitude of the vector formed by subtracting the earth's vector magnetic field, for example as specified by the International Geomagnetic Reference Field (IGRF), from the measured vector field. The VRMI is thus the intensity of the local field and should represent the magnitude of the magnetisation (remanent plus induced) of the local geological sources.

Computer software is used to process VAM data. One computer program, vectorMagTilt, converts the VAM data from an LTV (Longitudinal, Transversal, Vertical) aircraft-based coordinate system to a NED (North, East, Down) world-based coordinate system. Another, vectorMagCalibrate, computes the heading correction coefficients for the NED vector magnetic components. Bank and elevation correction may be similarly provided. The coefficients are subsequently to be used by a third program, vectorMagHeadingCorrection, to correct the raw NED vector magnetic component data for aircraft heading effects, and thence to compute relevant vector magnetic field attributes from the heading-corrected data, such as horizontal magnetic component H, inclination INC, and declination DEC. This program also computes residual magnetic properties by subtraction of a constant vector contribution.

The algorithm reads the LTV magnetic components, along with aircraft attitude data (heading-angle, elevation-angle, and bank-angle), and converts the LTV aircraft-based reading to a NED world coordinate system, through the following transformation process:

The vector magnetic flux gate sensors are located in the rear of the aircraft stinger, and record the magnetic field in three orthogonal directions: L (longitudinal), T (transversal), and V (vertical)

The LTV directions are assumed fixed with respect to the aircraft and are defined as follows:

The LTV directions are orthogonal and form a right-hand coordinate system.

The L direction is pointing towards the aft of the aircraft.

The T direction points M degrees upward towards starboard. M is assumed to be 45 degrees.

The V direction points M degrees upward towards port. M is assumed to be 45 degrees.

Figure 2:
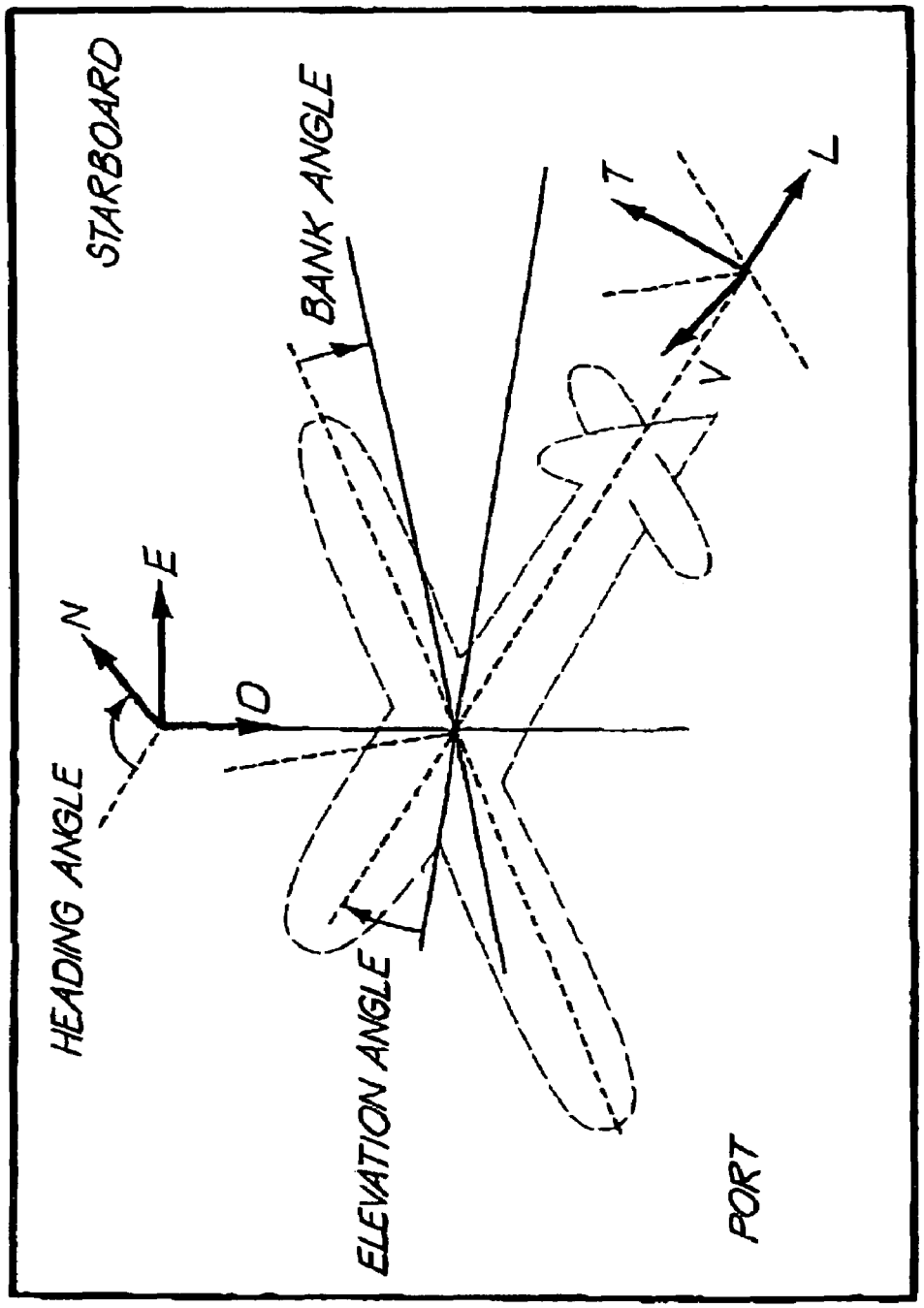
FIG. 2 is a diagram defining the aircraft-based LTV coordinate system, the world-based NED coordinate system, and the aircraft attitude variables (heading angle, elevation angle and bank angle).

The heading angle H is the aircraft heading in degrees positive clockwise from North. FIG. 2 depicts a northwesterly heading, and consequently a heading angle of approximately −45 or +315 degrees.

The elevation angle E is the angle of the aircraft pitch with respect to horizontal. The elevation angle is defined as positive up and negative down. FIG. 2 depicts an upward pitch and thus a positive elevation angle.

The bank angle B is the angle of the aircraft roll with respect to the starboard wing. The bank angle is defined as positive for a bank to starboard and negative for a bank to port. FIG. 2 depicts a bank to port, and thus a negative bank angle.

The conversion of vector magnetic readings from an aircraft-based LTV coordinate system to a world-based NED coordinate system is achieved as follows:

First, the contribution from each of the LTV components to the N component:

The L component projected onto N is:

$$\cos(H+180)\cdot\cos(E)\cdot L = -\cos(H)\cdot\cos(E)\cdot L$$

The T component projected onto N is:

$$\cos(H+180)\cdot\sin(E)\cdot\cos(90-(M-B))\cdot T + \sin(H+180)\cdot\cos(M-B)\cdot T = -\cos(H)\cdot\sin(E)\cdot\sin(M-B)\cdot T - \sin(H)\cdot\cos(M-B)\cdot T$$

The V component projected onto N is:

$$\cos(H + 180) \cdot \sin(E) \cdot \cos(M - B) \cdot V +$$
$$\sin(H + 180) \cdot \cos(90 + (M - B)) \cdot V =$$
$$-\cos(H) \cdot \sin(E) \cdot \cos(M - B) \cdot V - \sin(H) \cdot (-\sin(M - B)) \cdot V =$$
$$-\cos(H) \cdot \sin(E) \cdot \cos(M - B) \cdot V + \sin(H) \cdot \sin(M - B) \cdot V$$

Hence the total contribution of the LTV components in the N direction is:

$$N = -\cos(H)\cdot\{\cos(E)\cdot L + \sin(E)\cdot[\sin(M-B)\cdot T + \cos(M-B)\cdot V]\} + \sin(H)\cdot\{-\cos(M-B)\cdot T + \sin(M-B)\cdot V\}$$

Then, the contribution from each of the LTV components to the E component:

The L component projected onto E is:

$$\cos(H+90)\cdot\cos(E)\cdot L=-\sin(H)\cdot\cos(E)\cdot L$$

The T component projected onto E is:

$$\cos(H+90)\cdot\sin(E)\cdot\cos(90-(M-B))\cdot T+\sin(H+90)\cdot\cos(M-B)\cdot T=\sin(H)\cdot\sin(E)\cdot\sin(M-B)\cdot T+\cos(H)\cdot\cos(M-B)\cdot T$$

The V component projected onto E is:

$$\cos(H+90)\cdot\sin(E)\cdot\cos(M-B)\cdot V+\sin(H+90)\cdot\cos(90+(M-B))\cdot V =$$
$$-\sin(H)\cdot\sin(E)\cdot\cos(M-B)\cdot V+\cos(H)\cdot(-\sin(M-B))\cdot V =$$
$$-\sin(H)\cdot\sin(E)\cdot\cos(M-B)\cdot V-\cos(H)\cdot\sin(M-B)\cdot V$$

Hence the total contribution of the LTV components in the E direction is:

$$E=-\sin(H)\cdot\{\cos(E)\cdot L+\sin(E)\cdot[\sin(M-B)\cdot T+\cos(M-B)\cdot V]\}+\cos(H)\{\cos(M-B)\cdot T-\sin(M-B)\cdot V\}$$

Then, the contribution from each of the LTV components to the D component:

The L component projected onto D is:

$$\sin(E)\cdot L$$

The T component projected onto D is:

$$-\cos(E)\cdot\sin(M-B)\cdot T$$

The V component projected onto D is:

$$-\cos(E)\cdot\cos(M-B)\cdot V$$

Hence the total contribution of the LTV components in the D direction is:

$$D=\sin(E)\cdot L-\cos(E)\cdot[\sin(M-B)\cdot T+\cos(M-B)\cdot V]$$

This example is based on the assumption that the LTV coordinate system is perfectly aligned with the aircraft coordinate system. That is, that the L-axis aligns perfectly with the aircraft longitudinal axis, and not with the stinger longitudinal axis. (The stinger is mounted with a slight positive pitch with respect to aircraft axis). In practice, there will often be a small angular displacement between the LTV coordinate system defined by the three fluxgates and the aircraft coordinate system referenced by the heading, elevation and bank angles. The vectorMagTilt program therefore includes offset angles to correct for this angular displacement. The offset angles will vary between aircraft and vectorMagTilt allows for their adjustment as required.

vectorMagCalibrate is used on vector magnetic calibration flights, which are performed at the start of each AGG campaign. The calibration flight consists of eight flight lines flown at high altitude (preferably more than 3000 ft above the ground). The lines are all flown at the same altitude. The lines are flown in the eight headings 0°, 45°, 90°, 135°, 180°, 225°, 270°, and 315°. The lines should each be at least 3 km long and they should all intersect at the same point, roughly at the halfway mark for each line. The survey essentially forms a star or a pizza with 4 pair-wise parallel flight lines (for example at headings 0° and 180°, 45° and 225°, 90° and 270°, 135° and 315°). heading correction coefficients are output to screen at the end of the program execution.

The program first determines all the intersections of the calibration lines. Once all the intersections have been determined the algorithm determines the average position of the intersections, and outputs the statistics on how well the pilots managed have all the calibration lines intersect at one central point.

Having determined a central intersection point the program now extracts the attitude (heading-, elevation-, and bank-angle) and vector magnetic components (NED) from the database at the central intersection point for each of the calibration line.

The extracted data may be used to verify the heading-angle dependency of the uncorrected NED data or how well the subsequent sine-function fitting has performed.

The algorithm now attempts to fit a scaled sine function of the heading angle to each of the NED components. The functions to fit are:

$$N_{OBS}\approx C_{N,1}\cdot\sin(\text{head\_angle}-C_{N,2})+C_{N,3}$$

$$E_{OBS}\approx C_{E,1}\cdot\sin(\text{head\_angle}-C_{E,2})+C_{E,3}$$

$$D_{OBS}\approx C_{D,1}\cdot\sin(\text{head\_angle}-C_{D,2})+C_{D,3}$$

Note that currently no corrections are being applied for bank- and elevation-angle effects.

Having established the coefficients $C_{N,1}$, $C_{N,2}$, $C_{N,3}$, etc., we can at a later stage perform the heading correction as:

$$N_{OBS,corr}\approx N_{OBS}-C_{N,1}\cdot\sin(\text{head\_angle}-C_{N,2})$$

$$E_{OBS,corr}\approx E_{OBS}-C_{E,1}\cdot\sin(\text{head\_angle}-C_{E,2})$$

$$D_{OBS,corr}\approx D_{OBS}-C_{D,1}\cdot\sin(\text{head\_angle}-C_{D,2})$$

Once the algorithm has computed the correction coefficients the estimated main magnetic field strength, inclination and declination are output for checking purposes. The estimated main magnetic field inclination and declination values will usually be within 3 degrees of the associated IGRF values for the calibration site location.

Having determined the correction coefficients the algorithm displays these on screen. The data is presented in a format that is appropriate for cut-and-paste insertion into the parameter file for vectorMagHeadingCorrection.

This example does not attempt to incorporate bank-angle or elevation-angle into the correction model. It only uses attitude and vector magnetic information from the central intersection point, as it is assumed that the magnetic value should remain unchanged over this given point irrespective of the aircraft heading.

vectorMagleadingCorrection is used to Process VAM Data.

The correction coefficients to be applied in the heading correction process are those computed and output by the program vectorMagCalibrate.

The heading correction is achieved by subtracting a scaled, phase-shifted sine function of the heading angle from the individual NED vector magnetic components:

$$N_{OBS,corr}\approx N_{OBS}-C_{N,1}\cdot\sin(H-C_{N,2})$$

$$E_{OBS,corr}\approx E_{OBS}-C_{E,1}\cdot\sin(H-C_{E,2})$$

$$D_{OBS,corr}\approx D_{OBS}-C_{D,1}\cdot\sin(H-C_{D,2})$$

The correction coefficients $C_{N,1}$, $C_{N,2}$, $C_{E,1}$, etc. are output by the program vectorMagCalibrate to screen, and must be specified in the parameter file for vectorMagHeadingCorrection The screen output from vectorMagCalibrate is presented in a format that is appropriate for cut-and-paste insertion into the parameter file for vectorMagHeadingCorrection.

The algorithm reads the raw NED vector magnetic component data, along with aircraft attitude data (heading-angle, elevation-angle, and bank-angle), and corrects the raw NED vector magnetic component data for aircraft heading effects by subtracting the scaled and phase-shifted sine-functions (above).

Having completed the heading correction, vectorMagHeadingCorrection computes relevant vector magnetic field attributes from the heading-corrected data, such as horizontal magnetic component H, inclination INC, and declination DEC.

Figure 3:
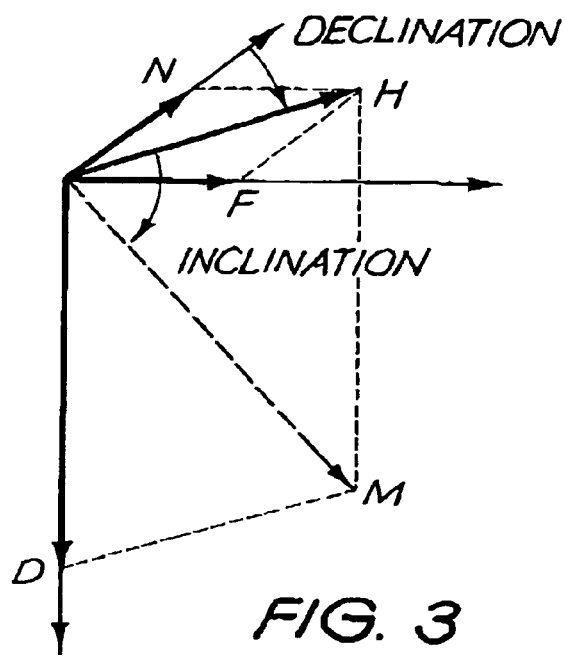
FIG. 3 is a diagram defining vector magnetic components and vector magnetic attributes of magnetic field M.
Figure 4:
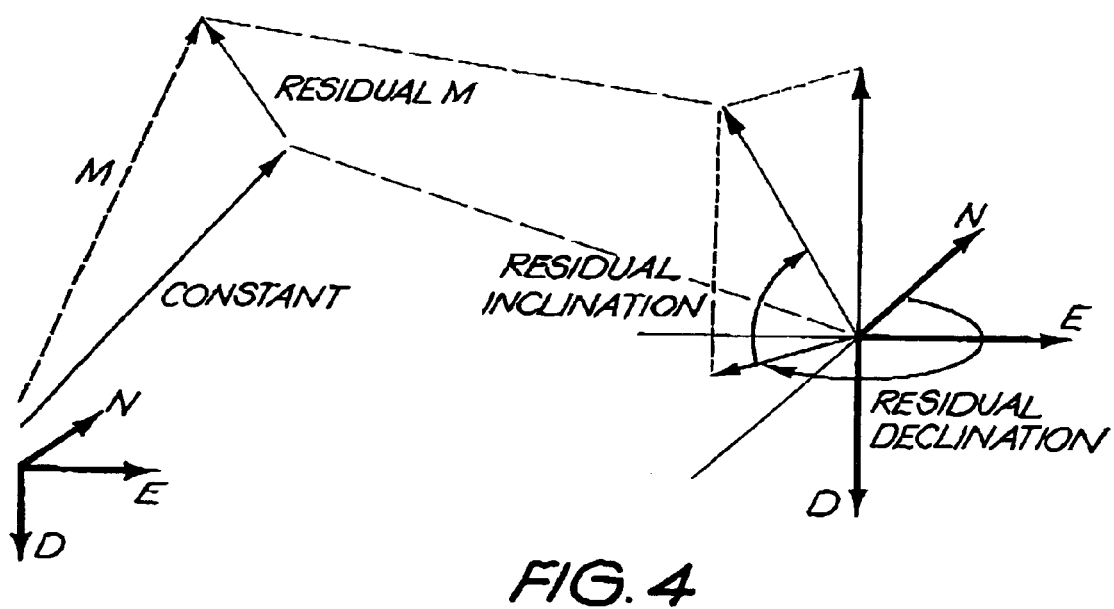
FIG. 4 is a diagram illustrating how the residual magnetic vector is computed by subtracting a constant vector from the observed vector magnetic components. Whilst the inclination and the declination of the magnetic vector is typically confined to a narrow angular range, the residual magnetic vector typically has inclination and declination values covering the entire angular range.

FIG. 3 depicts the various vector magnetic components and attributes associated with a magnetic field M. From FIG. 3 we get that the horizontal magnetic vector component H is computed as:

$$H = \sqrt{N^2 + E^2}.$$

The magnetic inclination INC is computed as;

$$INC = \tan^{-1}\left(\frac{D}{H}\right).$$

The magnetic declination DEC is computed as:

$$DEC = \tan^{-1}\left(\frac{E}{N}\right).$$

In addition to the "standard" vector magnetic attributes vectorMagHeadingCorrection also computes the residual magnetic attributes by first completing a subtraction of a constant vector contribution from the heading corrected NED vector magnetic components. The option exists to subtract either the survey-wide averages of the NED vector magnetic components, or to subtract the NED vector magnetic components derived from the vector magnetic calibration flight.

Surveys have been flown over a variety of formations. A comparison of the total magnetic intensity (TMI) data with the intensity of the residual vector magnetic (VRMI) data showed very similar results for weakly remanent formation but significantly different results for more strongly remanent formations. This demonstrated that the vector magnetic results are able to provide improved data for prospecting.

There are also a variety of effects which cause varying magnetic fields from the aircraft itself In particular, ferromagnetic parts of the aircraft will have a magnetic field induced from the earth's main field which will change as the orientation of those parts varies relative to the earth's field; electrical conductors will have eddy currents generated leading to the production of secondary fields; and remanently magnetised parts of the aircraft, producing constant magnetic field components in the aircraft-based LTV coordinate system, will generate changing magnetic fields in the NED coordinate system as the aircraft changes orientation.

These particular effects which depend on aircraft orientation can be written as functions of the orientation angles heading, bank and elevation provided by our rotation sensors. In practice, poor knowledge of the physical properties of each relevant aircraft part, limited knowledge of their position and motion and the high complexity of the total system may make this impractical. However, it is possible to use linear regression of the measured VAM data against the angular variables to estimate the coefficients of the linear terms of these functions; vector aero-magnetic compensation.

The main steps are:

a) identify the key regressors using data collected on a calibration flight;

b) estimate the regressor coefficients (the sensitivity of each component to each regressor) by standard linear regression; and c) correct survey VAM data by subtraction of the effects calculated as the product of each coefficient against each regressor.

An additional technique is based on the principle of removing the permanent magnet effect, induced magnetic effect and eddy-current magnetic effect of the aircraft from the magnetic data. This technique has been implemented in processing software using two computer programs, a modified vectorMagCalibrate program and a new code vectorMagCorrections. Only a single program vectorMagCorrections needs to be run to process vector magnetic data on a survey. Prior to processing vector magnetic data, the processing parameters will need to be computed by vectorMagCalibrate on calibration survey data.

The derivation of formulas for removing the permanent magnet effect, induced magnetic effect and eddy-current magnetic effect of the aircraft is based on the model of Leliak (1961) and is given below The measured magnetic field M is composed of the earth's field H (including ore-body effect), the permanent magnet field of the aircraft A, the induced magnetic field of the aircraft I, and the eddy-current magnetic field E, Hence $$M = H + A + I + E$$

In the aircraft reference frame, these are three equations at each observation point for the three magnetic field components, $$M_L = H_L + A_L + I_L + E_L \quad (1)$$

$$M_T = H_T + A_T + I_T + E_T \quad (2)$$

$$M_V = H_V + A_V + I_V + E_V \quad (3)$$

At the interception point of the eight calibration lines, the earth's main field is known (the IGRF field or that calculated in vectorMagCalibrate) in the earth's NED reference frame. Thus, the LTV components $H_L$, $H_T$, and $H_V$ can be calculated by rotation with the known aircraft attitude information The permanent magnet field components $A_L$, $A_T$, and $A_V$ are constants that are independent of aircraft attitude.

The L component of the induced magnetic field of the aircraft at the sensor is $$I_L = H_L LL + H_T TL + H_V VL \quad (4)$$

where LL is the magnetic field in L direction due to induced magnetic dipoles in the L direction for an unit inducing field, TL is the magnetic field in L direction due to induced magnetic dipoles in the T direction for an unit inducing field, and VL is the magnetic field in L direction due to induced magnetic dipoles in the V direction for an unit inducing field.

Similarly, the T component of the induced magnetic field of the aircraft at the sensor is $$I_T = H_L LT + H_T TT + H_V VT \quad (5)$$

and the V component of the induced magnetic field of the aircraft at the sensor is $$I_V = H_L LV + H_T TV + H_V VV \quad (6)$$

Here, (LL, TL, VL, LT, TT, VT, LV, TV, VV) are only dependent on the dimension, shape, and susceptibility of the parts of the aircraft body, but independent of the orientation of the aircraft.

The eddy-current magnetic field is produced by eddy currents in the aircraft body. A change of magnetic flux through a conducting loop will generate a current proportional to the time derivative of the flux in the loop. This current will produce a secondary magnetic field opposing the change in the magnetic flux. As the aircraft hull effectively consists of conducting loops of aluminium, these loops will experience a change in magnetic flux as the aircraft changes direction in the earth's magnetic field. These current loops will generate a secondary magnetic field measurable as the eddy-current field at the sensor. The L component of the eddy-current field can be written as $$E_L = \frac{\partial H_L}{\partial t} \cdot ll + \frac{\partial H_T}{\partial t} \cdot tl + \frac{\partial H_v}{\partial t} \cdot vl \quad (7)$$

where ll is the magnetic field in L direction due to eddy-current magnetic dipoles in the L direction for an unit inducing field, tl is the magnetic field in L direction due to eddy-current magnetic dipoles in the T direction for an unit inducing field, and VL is the magnetic field in L direction due to eddy-current magnetic dipoles in the V direction for an unit inducing field. Similarly, $$E_T = \frac{\partial H_L}{\partial t} \cdot lt + \frac{\partial H_T}{\partial t} \cdot tt + \frac{\partial H_v}{\partial t} \cdot vt \quad (8)$$

$$E_V = \frac{\partial H_L}{\partial t} \cdot lv + \frac{\partial H_T}{\partial t} \cdot tv + \frac{\partial H_V}{\partial t} \cdot vv \quad (9)$$

Here, (ll, tl, vl, lt, tt, vt, lv, tv, vv) are only dependent on the dimension, shape, and electrical conductivities of the parts of the aircraft body forming the conductive loops, but independent of the orientation of the aircraft.

Substituting equations (4)-(9) into equations (1), (2) and (3), we obtain $$H_L + A_L + H_L \cdot LL + H_T \cdot TL + \quad (10)$$
$$H_V \cdot VL + \frac{\partial H_L}{\partial t} \cdot ll + \frac{\partial H_T}{\partial t} \cdot tl + \frac{\partial H_V}{\partial t} \cdot vl = M_L$$

$$H_T + A_T + H_L \cdot LT + H_T \cdot TT + \quad (11)$$
$$H_V \cdot VT + \frac{\partial H_L}{\partial t} \cdot lt + \frac{\partial H_T}{\partial t} \cdot tt + \frac{\partial H_V}{\partial t} \cdot vt = M_T$$

$$H_V + A_V + H_L \cdot LV + H_T \cdot TV + \quad (12)$$
$$H_V \cdot VV + \frac{\partial H_L}{\partial t} \cdot lv + \frac{\partial H_T}{\partial t} \cdot tv + \frac{\partial H_V}{\partial t} \cdot vv = M_V$$

Using Leliak's (1961) model as encapsulated in equations (10)-(12), we can solve for the 24 unknowns $(A_L, A_T, A_V)$, (LL, TL, VL, LT, TT, VT, LV, TV, VV), and (ll, tl, vl, lt, tt, vt, lv, tv, vv) from the calibration survey data as follows. At the intersection point of the calibration lines, we can set up the equations (10)-(12) for each line. Since there are eight calibration lines, we have a total of 24 equations. In theory we should be able to solve for the 24 unknowns from these 24 equations. However, since the magnitude of eddy-current magnetic field is much smaller than the permanent magnetic field and induced magnetic fields, direct solutions of equations (10)-12) do not yield good solutions for (ll, tl, vl, lt, tt, vt, lv, tv, vv). In practice, we first ignore the eddy-current terms and solve for the 12 $(A_L, A_T, A_V)$ and (LL, TL, VL, LT, TT, VT, LV, TV, VV) factors for the permanent magnet and induced magnetic dipoles. The permanent magnet and induced magnetic fields are then computed and removed from the calibration survey data. The eddy-current factors are computed from high-pass filtered versions of the corrected data All the 24 factors are computed from a modified version of the vectorMagCalibrate program. VectorMagCalibrate also output corrected data to the calibration survey database.

All these factors are input parameters to the vectorMagCorrections program. In the current implementation of vectorMagCorrections, the eddy-current factors derived by vectorMagCalibrate are not used. Instead, new eddy-current factors are derived line-by-line on the survey data by a regression process. Furthermore, the data after corrections of permanent magnet, induced magnetic and eddy-current effects go through a residual angle effect correction by regression. The final corrected data are then written to the survey database.

Figure 5:
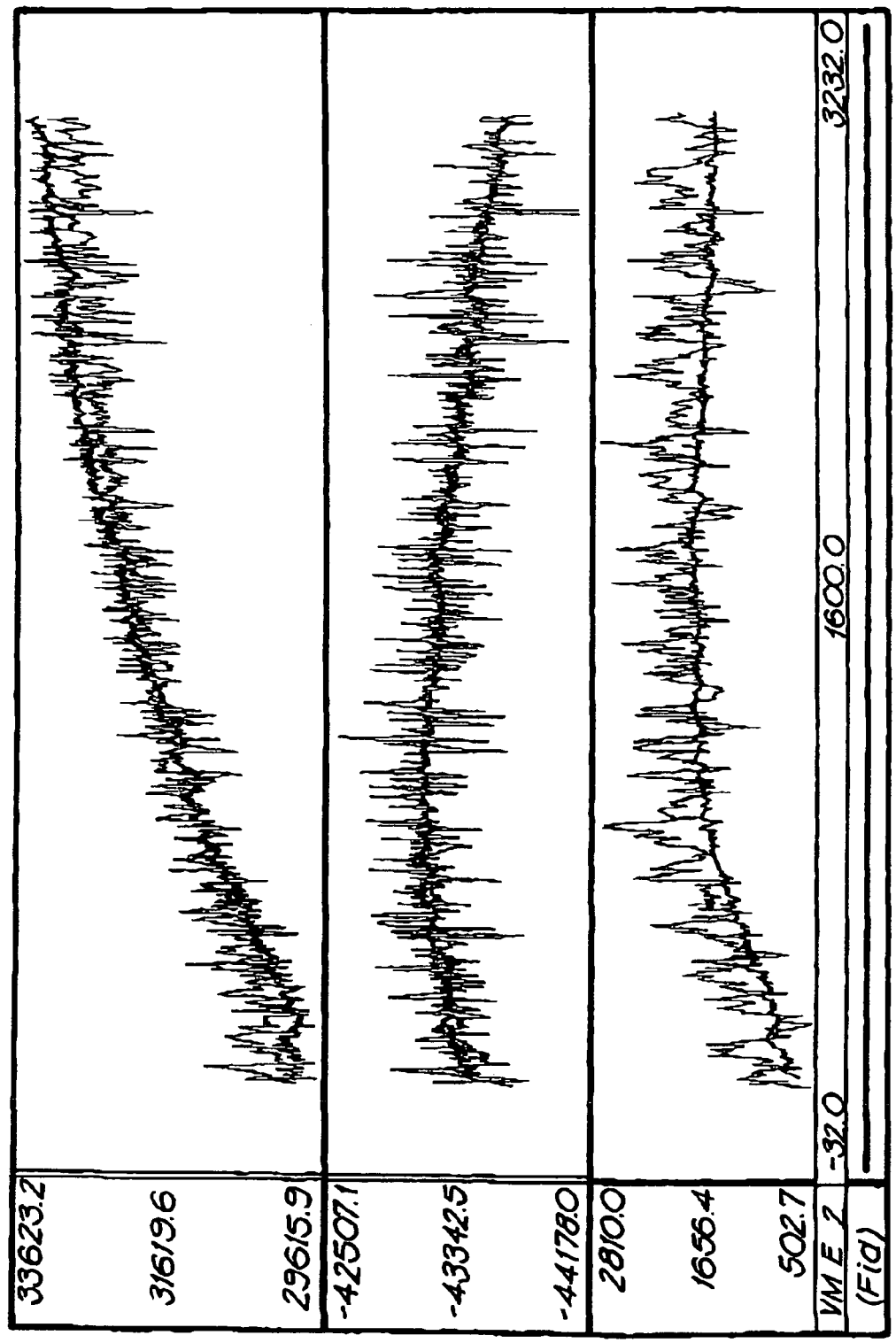
FIG. 5 is three graphs comparing data from vectorMagHeadingCorrection and data from vectorMagCorrections on a line of survey data (top: North component, middle: Down component, and bottom: East component).

FIG. 5 shows a comparison of the data from vectorMagHeadingCorrection and the data from vectorMagCorrections on a line of survey data. A visual inspection suggests a noise reduction improvement of a factor between 3 to 10. The improvement using the new technique for vector magnetic data processing is obvious.

Figure 6A:
FIG. 6a is a plot of vectorMagResidualIntensity (VMRI) of data from vectorMagHeadingCorrection.
Figure 6B:
FIG. 6b is a similar plot from vectorMagCorrections.

FIGS. 6a and 6b shows a comparison of the vectorMagneticResidualIntensity (VMRI) of data from vectorMagHeadingCorrection and vectorMagCorrections. The VMRI is the magnitude of the residual magnetic vector after subtracting the vector IGRF earth field from the data. The improvement using the new technique for vector magnetic data processing is obvious as shown in FIG. 6a and 6b.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An aircraft equipped for airborne vector magnetic exploration surveys, comprising:
   a gravity gradiometer including an internal navigation system of an aircraft;
   three magnetometers orthogonally mounted to measure the components of the earth's vector magnetic field in the aircraft reference frame;
   two rotation sensors provided by the internal navigation system, and mounted to measure the angular orientation of the aircraft; and,
   a recording system to record the measurements of the magnetometers and rotation sensors; wherein,
   correction coefficients computed from calibration survey data and the measured angular orientation is used to remove permanent magnetic effect, inducing magnetic effect and eddy-current magnetic effect of the aircraft from the measured components and to orientate the measured components into the earth's reference frame, so to derive true vector magnetic data from airborne surveys, that is vector aero-magnetic (VAM) data.

2. An aircraft according to claim 1, where the three magnetometers are flux-gate magnetometers, each measuring the component of the earth's vector magnetic field along its axis, so that the triad is able to measure all three orthogonal components.

3. An aircraft according to claim 1, where the rotation sensors are gyroscopes which measure heading, bank and elevation.

4. A method of processing data collected during an airborne survey claimed in claim 1, comprising the following steps:
   collecting data describing the orientation or attitude of the aircraft using one or more rotation sensors;
   collecting vector magnetic field data using the three magnetometers orthogonally mounted in the aircraft; and
   using correction coefficients computed from calibration survey data and the aircraft attitude data provided by the rotation sensors to remove the permanent magnetic effect, induced magnetic effect and eddy-current magnetic effect of the aircraft from the magnetometer data to change the orientation of the magnetometer data; then,
   deriving true vector aero-magnetic data.

5. A method according to claim 4 where the processing is done in real time in the aircraft during a survey flight.

6. A method according to claim 4 where the processing is done after the flight has taken place.

7. A method according to claim 4, where the orientation processing involves the rotation of three components in the aircraft reference frame, that is longitudinal, transversal and vertical, to earth's reference frame, that is north, east and down, and computing and applying heading correction coefficients to the resulting components in the earth's reference frame to account for the direction of the heading of the aircraft.

8. A method according to claim 4, where the steps first involve ignoring the eddy-current effects of the aircraft and solving for the factors for the permanent magnet and induced magnetic dipole field of the aircraft.

9. A method according to claim 4, where the permanent magnet and induced magnetic dipole fields are computed and removed from the measured components obtained during the calibration flight.

10. A method according to claim 8, where the eddy-current effects are then computed from a high-pass filtered version of the corrected data.

11. A method according to claim 8, where the eddy-current factors are derived line-by-line from the data collected during an airborne survey.

12. A method according to claim 11, where the data collected during an airborne survey, after corrections of permanent magnet, induced magnetic and eddy-current effects, are further corrected by a process of regression to remove any residual angle effect.

13. A method according to claim 12, where the further corrected data are then written to the survey database.

14. An aircraft according to claim 1, wherein the calibration survey data is collected during a calibration flight that is comprised of a plurality of flight lines flown at the same altitude and intersect at the same point.

15. An aircraft according to claim 1, wherein processing to remove the magnetic effects of the aircraft and to orient the measured components is performed simultaneously.

* * * * *

UNITED STATES PATENT AND TRADEMARK OFFICE
CERTIFICATE OF CORRECTION

PATENT NO. : 7,262,601 B2
APPLICATION NO. : 10/504213
DATED : August 28, 2007
INVENTOR(S) : Dransfield et al.

Page 1 of 1

It is certified that error appears in the above-identified patent and that said Letters Patent is hereby corrected as shown below:

In claim 1, column 10, line 50, delete "internal" and replace with --inertial--.

In claim 1, column 10, line 55, delete "internal" and replace with --inertial--.

Signed and Sealed this

Eighteenth Day of March, 2008

JON W. DUDAS
*Director of the United States Patent and Trademark Office*